US012077114B2

(12) United States Patent
Wada

(10) Patent No.: US 12,077,114 B2
(45) Date of Patent: Sep. 3, 2024

(54) VEHICLE FRONT STRUCTURE

(71) Applicant: SUBARU CORPORATION, Tokyo (JP)

(72) Inventor: Yoshio Wada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 272 days.

(21) Appl. No.: 17/840,755

(22) Filed: Jun. 15, 2022

(65) Prior Publication Data

US 2023/0011059 A1 Jan. 12, 2023

(30) Foreign Application Priority Data

Jul. 12, 2021 (JP) ................................ 2021-114687

(51) Int. Cl.
*B60R 19/04* (2006.01)
*B62D 25/20* (2006.01)
*B62D 21/15* (2006.01)
*B62D 25/08* (2006.01)

(52) U.S. Cl.
CPC .............. *B60R 19/04* (2013.01); *B62D 25/20* (2013.01); *B62D 21/152* (2013.01); *B62D 25/08* (2013.01)

(58) Field of Classification Search
CPC .............. B60R 19/04; B60R 2019/247; B60R 2021/0023; B60R 2021/0009; B62D 25/20; B62D 21/152; B62D 25/08
USPC .......................................... 296/187.09, 187.1
See application file for complete search history.

(56) References Cited

U.S. PATENT DOCUMENTS 8,596,711 B2 * 12/2013 Yasui .................. B62D 25/082 296/187.1
2021/0086835 A1 * 3/2021 Serada ................. B62D 21/155

FOREIGN PATENT DOCUMENTS

JP 2021-054389 A 4/2021

* cited by examiner

*Primary Examiner* — Amy R Weisberg
*Assistant Examiner* — Dana D Ivey
(74) *Attorney, Agent, or Firm* — MCGINN I.P. LAW GROUP, PLLC.

(57) ABSTRACT

A vehicle front structure includes side frames in pairs, a bumper beam, a lower beam, coupling members in pairs, and gussets. The bumper beam and the lower beam extend in the vehicle width direction. Each coupling member extends in a vehicle upward-downward direction on an outer side of a corresponding one of the side frames in the vehicle width direction. The coupling members couple the bumper beam and the lower beam. A vehicle-front-side end part of each gusset is coupled to a middle part of a corresponding one of the coupling members in the vehicle upward-downward direction. A vehicle-rear-side end part of each gusset is coupled to the corresponding one of the side frames.

3 Claims, 5 Drawing Sheets

10
30B
30C
32A
12
30
32B
32
32C
30A
24A
24
24A
22B
22B
22A
22
20
11
14
16
S
V
LH
FR

LH
UP
22C
30
20
22B
22A
22
22B
14
S
16
11
12
13
V

V
10
32
11
S
14
14
16
16
UP
FR

VEHICLE FRONT STRUCTURE

CROSS-REFERENCE TO RELATED APPLICATIONS

The present application claims priority from Japanese Patent Application No. 2021-114687 filed on Jul. 12, 2021, the entire contents of which are hereby incorporated by reference.

BACKGROUND

The disclosure relates to a vehicle front structure.

A vehicle body that is disclosed in Japanese Unexamined Patent Application Publication No. 2021-54389 has a front structure in which a bumper beam extends in the vehicle width direction at a front end part of a vehicle. The bumper beam is supported by side frames that are on a vehicle rear side of the bumper beam. In addition, a lower beam extends in the vehicle width direction under the bumper beam, and the lower beam is supported by subframes that are on a vehicle rear side of the lower beam. With this structure, for example, at the time the vehicle has an offset frontal collision, reaction forces are applied to a collision object (opposing vehicle) from the bumper beam and the lower beam. This prevents reaction forces from acting locally on the opposing vehicle. Thus, it is possible to reduce the possibility of damaging the collision object (opposing vehicle) at the time of a frontal collision.

SUMMARY

An aspect of the disclosure provides a vehicle front structure. The vehicle front structure includes side frames in pairs, a bumper beam, a lower beam, coupling members in pairs, and gussets. The side frames extend in a vehicle front-rear direction of a vehicle respectively on both side of a front part of the vehicle in a vehicle width direction of the vehicle. The bumper beam extends in the vehicle width direction. The bumper beam is coupled to respective vehicle-front-side end parts of the side frames. Both of longitudinal-direction end parts of the bumper beam are disposed outward in the vehicle width direction, as seen from the side frames. The lower beam extends in the vehicle width direction on a vehicle lower side of the bumper beam. The coupling members each extends in a vehicle upward-downward direction of the vehicle on an outer side in the vehicle width direction as seen from a corresponding one of the side frames. The coupling members couple the bumper beam and the lower beam. Each of the gussets is provided on the outer side in the vehicle width direction, as seen from the corresponding one of the side frames. The each gussets extends obliquely outward in the vehicle width direction toward a forward of the vehicle as seen from above the vehicle. The each of the gussets extends obliquely downward toward the forward of the vehicle as seen from the vehicle width direction. A vehicle-front-side end part of the each of the gussets is coupled to a middle part of a corresponding one of the coupling members in the vehicle upward-downward direction. A vehicle-rear-side end part of the each of the gussets is coupled to the corresponding one of the side frames.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

Figure 1:
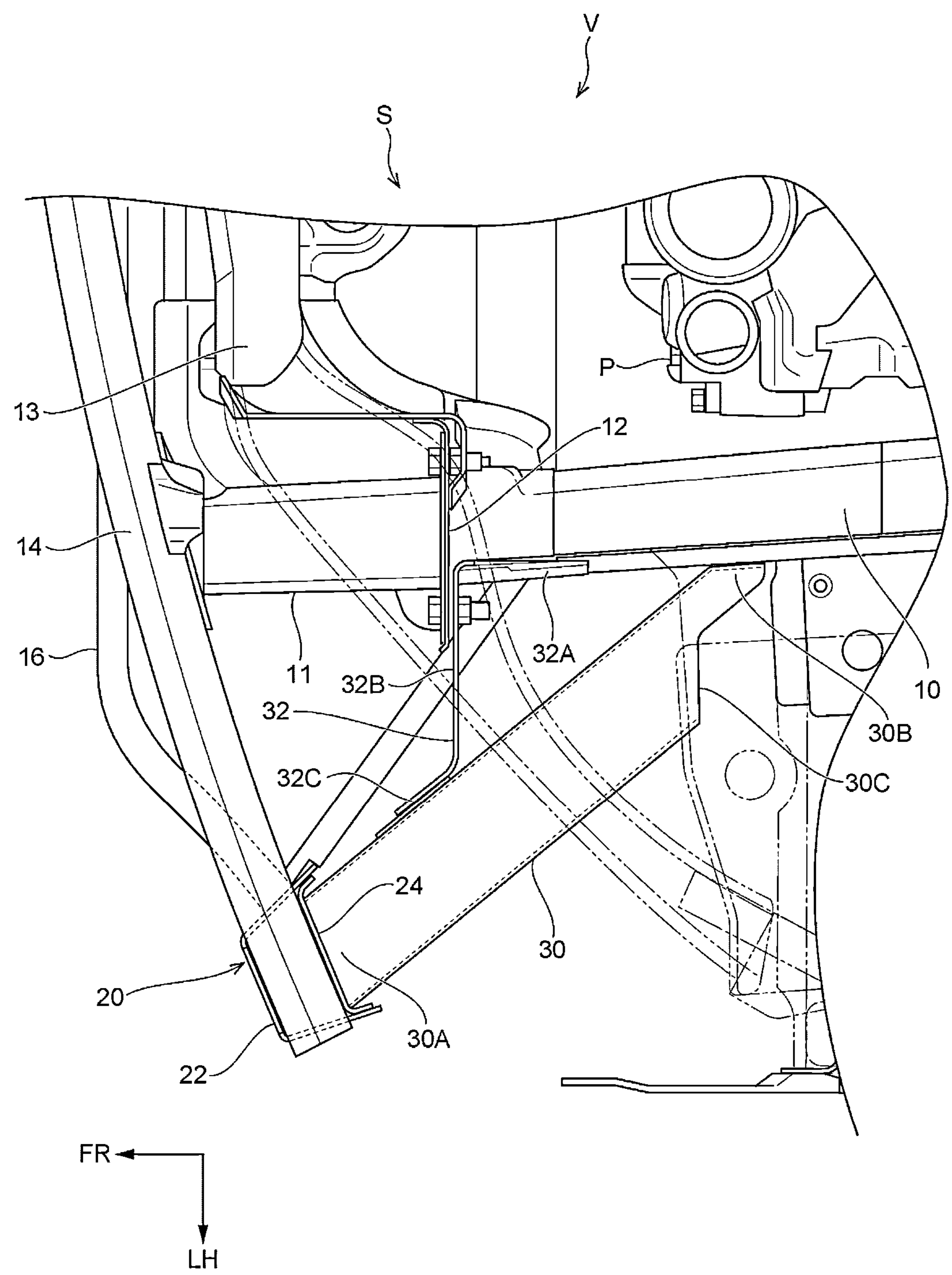
FIG. 1 is a top plan view of a vehicle, schematically illustrating a left front part of the vehicle that employs a vehicle front structure according to an embodiment of the disclosure.

In a vehicle body front structure, a vehicle-width-direction outer end part of each of a bumper beam and a lower beam protrudes outward, in the vehicle width direction, of a side frame. In these conditions, at the time of a frontal collision of a vehicle, including an offset frontal collision, reaction forces may not be effectively applied to a collision object from the vehicle-width-direction outer end parts of the vehicle. For example, as to a small overlap frontal collision in which an overlap ratio of a collision object in the vehicle width direction is relatively small among offset frontal collisions, a collision object collides mainly with the vehicle-width-direction outer end parts of the bumper beam and the lower beam, and therefore, reaction forces may not be effectively applied to the collision object.

It is desirable to provide a vehicle front structure configured to effectively apply reaction forces to a collision object at vehicle-width-direction outer end parts while exhibiting low possibility of damaging the collision object.

Hereinafter, a vehicle (automobile) "V" that employs a vehicle front structure "S" according to an embodiment of the disclosure will be described by using the drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. Note that the drawings illustrate a vehicle front side, a vehicle upper side, and a vehicle left side (one side in the vehicle width direction) as viewed from above the vehicle, of the vehicle "V", by an arrow FR, an arrow UP, and an arrow LH, respectively. In addition, unless otherwise noted, the following descriptions using an upward-downward direction, a front-rear direction, and a right-left direction mean a vehicle upward-downward direction, a vehicle front-rear direction, and a vehicle right-left direction, respectively.

As illustrated in FIGS. 1 to 4, the vehicle front structure “S” is employed at a front part of the vehicle “V”. The vehicle front structure “S” is symmetrical with respect to the center in the right-left direction of the vehicle “V”. In consideration of this, the following describes the vehicle front structure “S” at a left front part of the vehicle “V”, and description of the vehicle front structure “S” at a right front part of the vehicle “V” will be omitted. The vehicle front structure “S” includes a side frame 10, a bumper beam 14, a lower beam 16, a beam coupling member 20 being a coupling member, and a gusset 30.

(Side Frame 10)

The side frame 10 has an approximately rectangular hollow pillar shape extending in the front-rear direction, and it is disposed on a vehicle-width-direction outer part of the front part of the vehicle “V” to constitute a frame of the front part of the vehicle “V”. The space on an inner side in the vehicle width direction from the side frame 10, at the front part of the vehicle “V”, is used as an engine room for housing a power unit “P” of the vehicle “V”. A crash box 11 is provided to a front side of the side frame 10. The crash box 11 has an approximately rectangular tube shape having an axial direction in the front-rear direction, and a rear end part of the crash box 11 is fastened to a front end part of the side frame 10. A plate member 12 that extends in the upward-downward direction is provided between the side frame 10 and the crash box 11. A middle part, in the upward-downward direction, of the plate member 12 is inserted between the side frame 10 and the crash box 11 and is fixed to them. In addition, a radiator support 13 is provided on an inner side, in the vehicle width direction, of the crash box 11, and the radiator support 13 is coupled to the plate member 12.

(Bumper Beam 14)

The bumper beam 14 extends in the vehicle width direction and constitutes a frame of a front end part of the vehicle “V”. The bumper beam 14 has an approximately B shape in a left side sectional view. Thus, the bumper beam 14 has a closed sectional structure with a pair of upper and lower rectangular closed cross sections. The bumper beam 14 is joined to a front end part of the crash box 11 in a state in which a vehicle-width-direction outer end part of the bumper beam 14 protrudes outward, in the vehicle width direction, of the side frame 10. That is, the bumper beam 14 is indirectly coupled to the side frame 10 via the crash box 11. In another example, the crash boxes 11 may be omitted and the front end parts of the side frames 10 may extend forward of their positions of this embodiment such that the bumper beam 14 is directly coupled to the side frames 10. The bumper beam 14 is curved into an approximately circular arc shape so as to have a vehicle-width-direction center part being convex forward, in a plan view.

(Lower Beam 16)

The lower beam 16 extends in the vehicle width direction under the bumper beam 14. While a vehicle-width-direction outer end part of the lower beam 16 is disposed outward, in the vehicle width direction, of the side frame 10, a vehicle-width-direction outer part of the lower beam 16 is coupled to a lower end part of the plate member 12, below the side frame 10. The lower beam 16, as well as the bumper beam 14, constitutes the frame of the front end part of the vehicle “V”. The lower beam 16 has a rectangular closed sectional structure at the vehicle-width-direction outer part and has an open sectional structure that opens rearward, at a vehicle-width-direction center part. The vehicle-width-direction outer part of the lower beam 16 is inclined rearward as it goes outward in the vehicle width direction in a plan view. The vehicle-width-direction outer end part of the lower beam 16 is disposed under the bumper beam 14.

(Beam Coupling Member 20)

The beam coupling member 20 has an approximately rectangular pillar shape extending in the upward-downward direction and couples the vehicle-width-direction outer end part of the bumper beam 14 and the vehicle-width-direction outer end part of the lower beam 16 to each other. The beam coupling member 20 includes a first coupling member 22 and a second coupling member 24. The first coupling member 22 is a main part of the beam coupling member 20. The second coupling member 24 constitutes a rear end part of the beam coupling member 20.

The first coupling member 22 is made of a steel plate. The first coupling member 22 extends in the upward-downward direction and has an approximately U shape that opens rearward in a plan view. In one embodiment, the first coupling member 22 includes a front wall 22A and a pair of side walls 22B. The front wall 22A is arranged in parallel to a front surface of the bumper beam 14 in a plan view. The side walls 22B extend from both ends in the right-left direction of the front wall 22A toward rear and inward in the vehicle width direction.

As in the case of the first coupling member 22, the second coupling member 24 is made of a steel plate. The second coupling member 24 has an approximately long plate shape extending in the upward-downward direction and is arranged behind the front wall 22A of the first coupling member 22 in an approximately parallel manner. Each end in the right-left direction of the second coupling member 24 has a flange 24A that is bent rearward and inward in the vehicle width direction. The second coupling member 24 is disposed inside a rear end part of the first coupling member 22, and the flanges 24A are joined to rear end parts of the right and left side walls 22B of the first coupling member 22. Thus, the beam coupling member 20 has an approximately rectangular closed cross sectional shape.

The front wall 22A of the first coupling member 22 has a joint 22C that extends upward. The beam coupling member 20 is disposed under the vehicle-width-direction outer end part of the bumper beam 14. The joint 22C faces the front side of the vehicle-width-direction outer end part of the bumper beam 14 and is joined to the vehicle-width-direction outer end part of the bumper beam 14. An upper end part of the second coupling member 24 protrudes upward more than the side wall 22B of the first coupling member 22. The upper end part of the second coupling member 24 faces the rear side of the vehicle-width-direction outer end part of the bumper beam 14 and is joined to the vehicle-width-direction outer end part of the bumper beam 14.

The beam coupling member 20 is adjacently disposed on the left of a vehicle-width-direction outer end of the lower beam 16. The vehicle-width-direction outer end of the lower beam 16 is joined to the right side wall 22B of the first coupling member 22. Thus, the vehicle-width-direction outer end parts of the bumper beam 14 and the lower beam 16 are coupled by the beam coupling member 20, on the outer side in the vehicle width direction of the side frame 10.

(Gusset 30)

The gusset 30 is made of a steel plate and has an approximately rectangular pillar shape. The gusset 30 is disposed on the outer side, in the vehicle width direction, of the side frame 10. The gusset 30 extends obliquely outward in the vehicle width direction as it goes forward in a plan view and also extends obliquely downward as it goes forward as seen from an outer side in the vehicle width direction. A front end part 30A of the gusset 30 is adjacently disposed on the rear side of the beam coupling member 20 and is joined to a middle part, in the upward-downward direction, of the beam coupling member 20. A right wall at a rear end part 30B of the gusset 30 is bent in such a manner as to face an outer side surface in the vehicle width direction of the side frame 10, and the rear end part 30B of the gusset 30 is joined to the side frame 10. The rear end part 30B of the gusset 30 has a cut-off part 30C that opens outward in the vehicle width direction. The cut-off part 30C provides an approximately U shape that opens outward in the vehicle width direction, at the rear end part 30B of the gusset 30, as seen from a rear side.

The gusset 30 is disposed lower than an upper end part of the power unit “P” (refer to a grayed part in FIG. 3) as seen from an outer side in the vehicle width direction. The rear end part 30B of the gusset 30 is disposed at a position where the rear end part 30B of the gusset 30 overlaps a front end part of the power unit “P”. Moreover, as seen from an outer side in the vehicle width direction, a vertical distance H1 (refer to FIG. 3) between the front end part 30A and the rear end part 30B of the gusset 30 is equal to or less than a vertical distance H2 (refer to FIG. 3) between the rear end part 30B of the gusset 30 and the upper end part of the power unit “P” (in this embodiment, the vertical distance H1 and the vertical distance H2 are set to be approximately the same). Note that a vertical position of the front end part 30A of the gusset 30 is a center position, in the upward-downward direction, of the front end part 30A, whereas a vertical position of the rear end part 30B of the gusset 30 is a center position, in the upward-downward direction, of the rear end part 30B.

Figure 2:
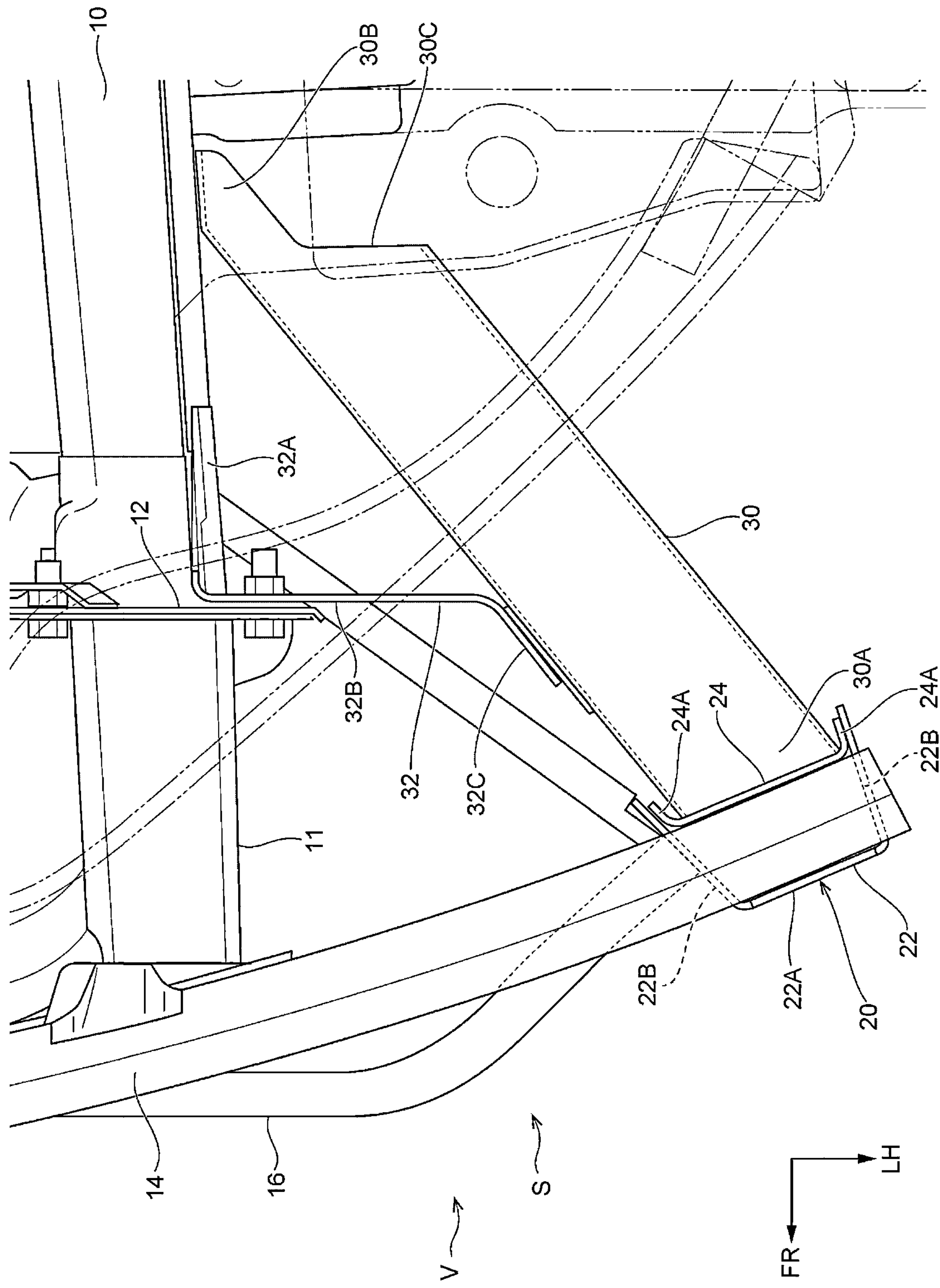
FIG. 2 is an enlarged plan view illustrating a coupled state of a beam coupling member and a gusset in FIG. 1.
Figure 3:
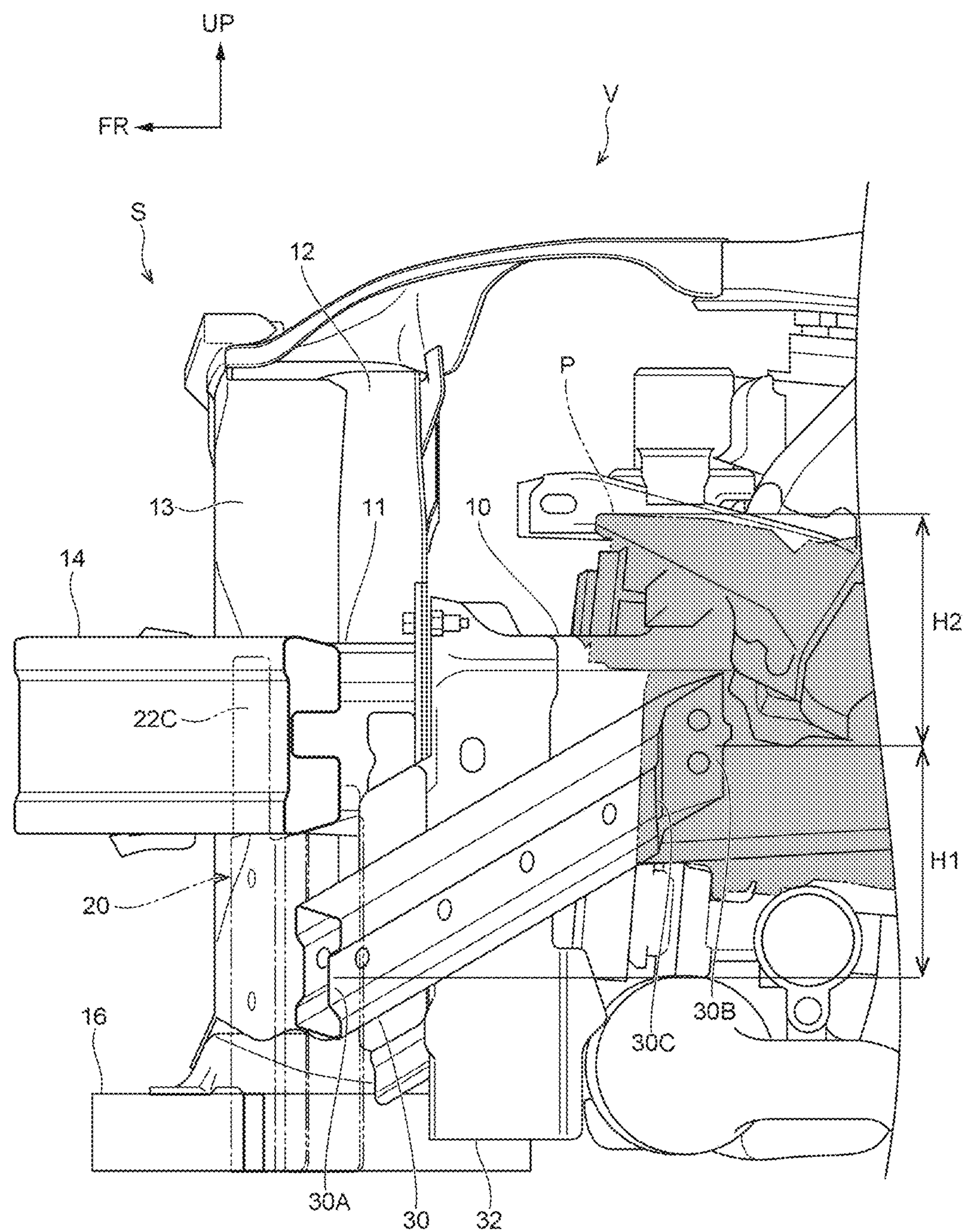
FIG. 3 is a left side view of the vehicle, schematically illustrating the left front part of the vehicle in FIG. 1.
Figure 4:
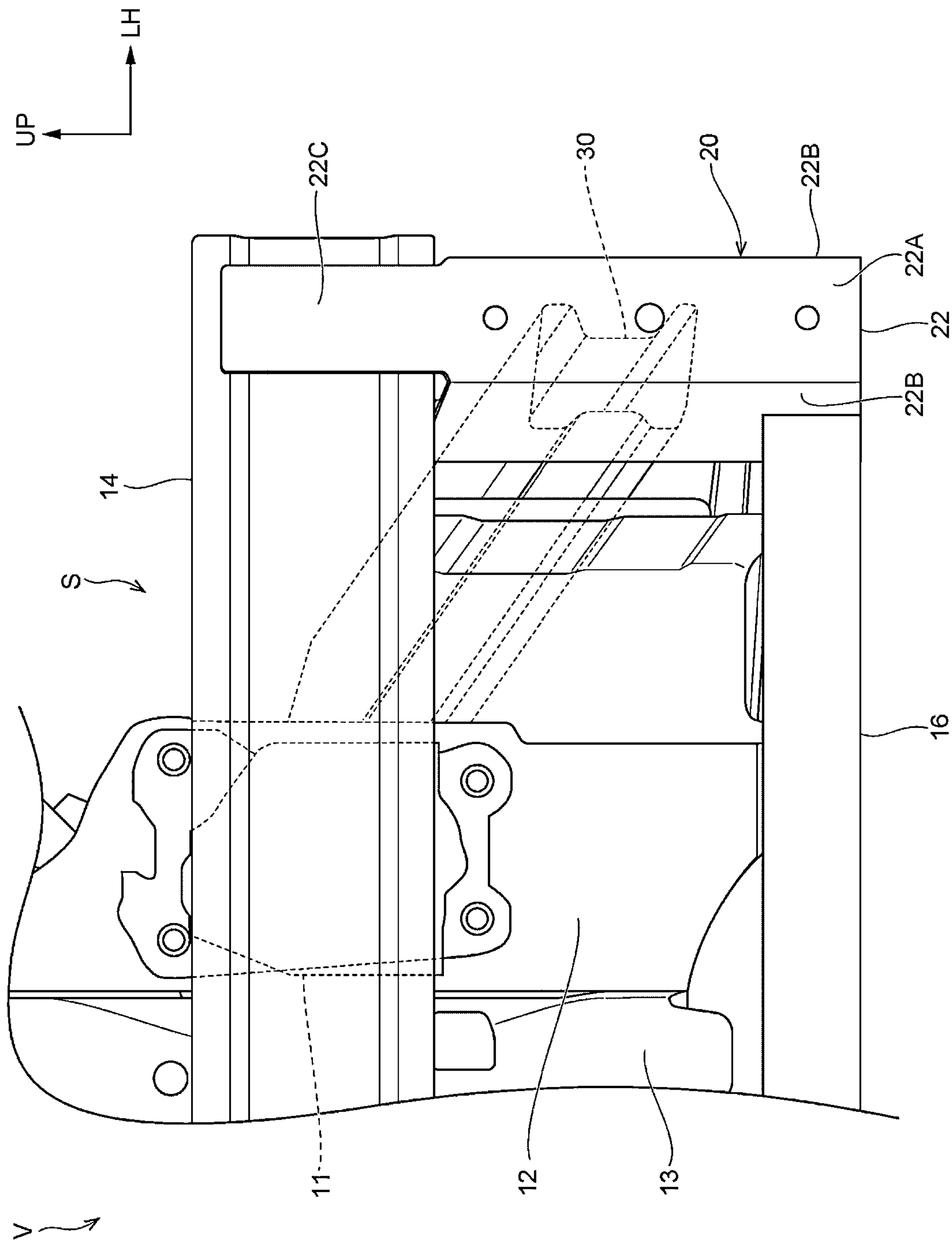
FIG. 4 is a front view of the vehicle, illustrating a coupled state of a vehicle-width-direction outer end part of a bumper beam and a vehicle-width-direction outer end part of a lower beam that are coupled by the beam coupling member in FIG. 1.

A longitudinal-direction middle part of the gusset 30 is coupled to the front end part of the side frame 10 by a bracket 32 (refer to FIG. 2). The bracket 32 is made of a steel plate and is bent into an approximately crank shape in a plan view. In one embodiment, the bracket 32 includes a rear wall 32A, a coupling wall 32B, and a front wall 32C. The rear wall 32A has a thickness direction in the right-left direction. The coupling wall 32B extends outward, in the vehicle width direction, from a front end part of the rear wall 32A. The front wall 32C extends forward as well as outward, in the vehicle width direction, from a vehicle-width-direction outer end part of the coupling wall 32B. The rear wall 32A is adjacently disposed on an outer side, in the vehicle width direction, of the front end part of the side frame 10 and is joined to the side frame 10. The front wall 32C is adjacently disposed on an inner side, in the vehicle width direction, of the longitudinal-direction middle part of the gusset 30 and is joined to the gusset 30.

Next, functions and effects of this embodiment will be described.

In the vehicle “V” thus configured, the bumper beam 14 and the lower beam 16 extend in the vehicle width direction at the front end part of the vehicle “V”, while the lower beam 16 is disposed under the bumper beam 14. The bumper beam 14 is coupled to the pair of the side frames 10, whereas the lower beam 16 is coupled to the side frame 10 via the plate member 12.

Herein, the beam coupling member 20 extends in the vehicle upward-downward direction on an outer side, in the vehicle width direction, of the side frame 10, and it couples the bumper beam 14 and the lower beam 16 to each other. With this structure, at the time the vehicle “V” has an offset frontal collision, the bumper beam 14, the lower beam 16, and the beam coupling member 20 receive a collision object by their surfaces. This results in suppressing local application of reaction forces from the vehicle “V” to the collision object. Thus, it is possible to effectively reduce the possibility of damaging the collision object (opposing vehicle).

In another case, at the time of a small-overlap frontal collision, a collision object collides mainly with the vehicle-width-direction outer parts extending outward of the side frame 10 of the bumper beam 14 and the lower beam 16. For this reason, collision loads toward a rear side act mainly on the vehicle-width-direction outer parts of the bumper beam 14 and the lower beam 16 and on the beam coupling member 20.

Herein, the gusset 30 extends in the front-rear direction behind the beam coupling member 20, while the front end part 30A of the gusset 30 is coupled to the middle part, in the upward-downward direction, of the beam coupling member 20, whereas the rear end part 30B of the gusset 30 is coupled to the side frame 10. That is, the gusset 30 extends obliquely outward in the vehicle width direction as it goes forward in a plan view and also extends obliquely downward as it goes forward as seen from the vehicle width direction, and the gusset 30 couples the beam coupling member 20 and the side frame 10 to each other. Thus, the gusset 30 supports the vehicle-width-direction outer parts of the bumper beam 14 and the lower beam 16 as well as the beam coupling member 20, from behind. At the time of a small-overlap frontal collision, this structure enables effectively applying reaction forces to a collision object from the bumper beam 14, the lower beam 16, and the beam coupling member 20. That is, reaction forces can be effectively applied to a collision object from the vehicle-width-direction outer end part of the vehicle “V”.

Moreover, the gusset 30 is provided so as to produce a reaction force to a collision object at the time of a small-overlap frontal collision, which enables further effectively reducing the possibility of damaging a collision object (opposing vehicle) at the time of an offset frontal collision. The reason of this is as follows. If the gusset 30 is omitted in the vehicle “V” (hereinafter, this structure is called a “vehicle front structure of a comparative example”), a collision object can be received by the surfaces of the bumper beam 14, the lower beam 16, and the beam coupling member 20; however, the vehicle-width-direction outer parts of the bumper beam 14 and the lower beam 16 are not supported from behind. Thus, in this case, at the time of an offset frontal collision, a front lower end part of the vehicle “V” deforms in such a manner that the bumper beam 14 protrudes forward relative to the lower beam 16, as illustrated by the alternate long and two short dashes lines in FIG. 5. In other words, the front lower end part of the vehicle “V” deforms in such a manner as to be bent down into an approximately Z shape in a side view. Under these conditions, the bumper beam 14 may ride over a collision object (opposing vehicle), and the effect for reducing the possibility of damaging the collision object (opposing vehicle) may be decreased.

Figure 5:
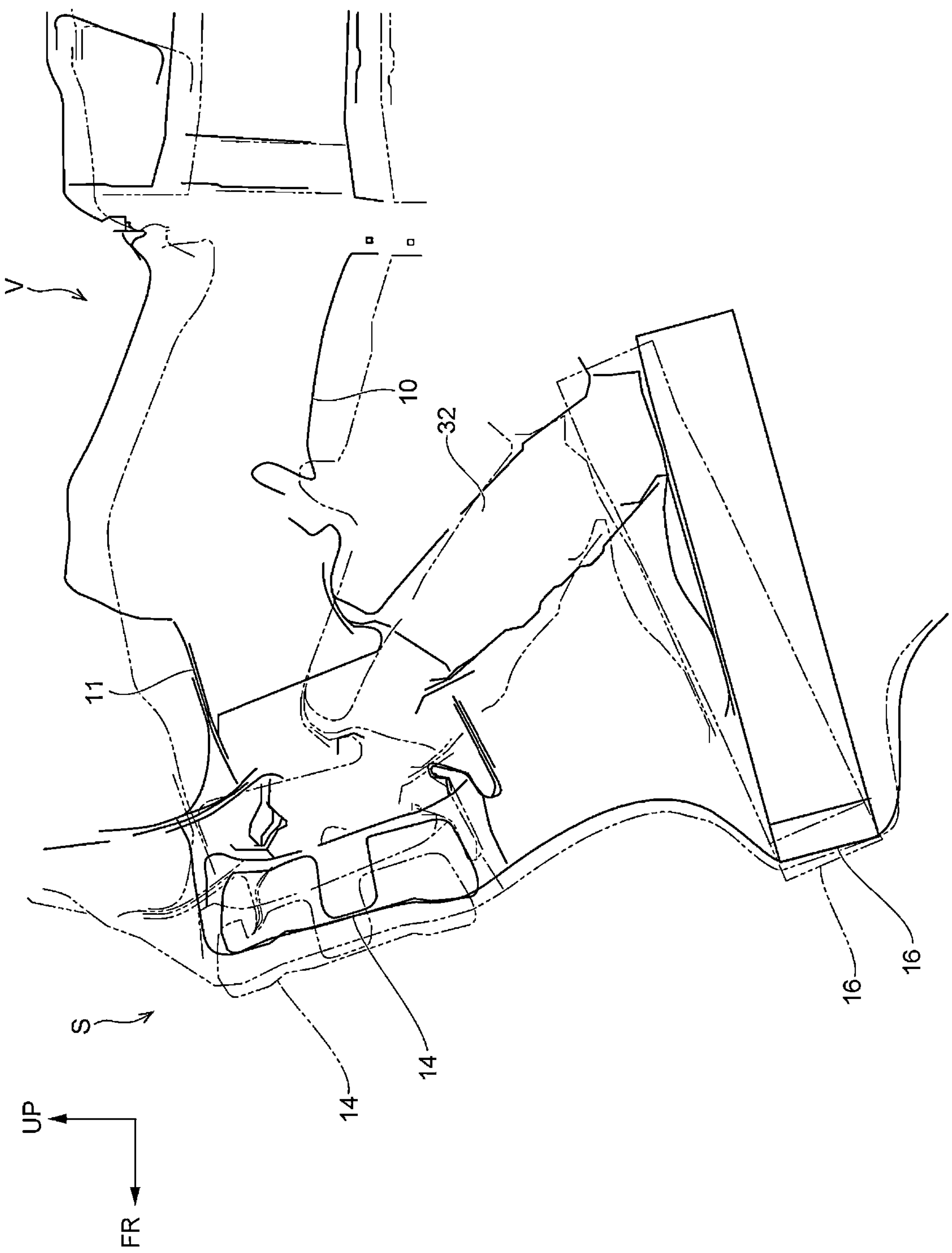
FIG. 5 is a left side view of the vehicle, illustrating deformation movements of the bumper beam and the lower beam at the time of an offset frontal collision.

On the other hand, in the vehicle front structure “S”, the gusset 30 couples the middle part, in the upward-downward direction, of the beam coupling member 20 and the side frame 10 to each other to support the lower beam 16 from behind, as described above. With this structure, at the time of an offset frontal collision, the bumper beam 14 is prevented from protruding forward relative to the lower beam 16, as illustrated by the solid lines in FIG. 5, compared with the case of the vehicle front structure of the comparative example. This results in preventing the front lower end part of the vehicle “V” from being bent down into an approximately Z shape in a side view. Thus, compared with the case of the vehicle front structure of the comparative example, the bumper beam 14 is suppressed from riding over a collision object (opposing vehicle), and reaction forces to the collision object are made uniform, at the time of an offset frontal collision. In this manner, it is possible to further effectively reduce the possibility of damaging a collision object (opposing vehicle) at the time of an offset frontal collision.

The beam coupling member 20 couples the vehicle-width-direction outer end parts of the bumper beam 14 and the lower beam 16 to each other. Thus, the vehicle-width-direction outer parts extending outward from the side frame 10 of the bumper beam 14 and the lower beam 16 are firmly supported from behind by the gusset 30. At the time of a small-overlap frontal collision, this structure enables effectively applying reaction forces to a collision object from the whole vehicle-width-direction outer parts of the bumper beam 14 and the lower beam 16.

In addition, as seen from an outer side in the vehicle width direction, the gusset 30 is disposed lower than the upper end part of the power unit "P", while the rear end part 30B of the gusset 30 is disposed at a position where the rear end part 30B of the gusset 30 overlaps the front end part of the power unit "P". At the time of a small-overlap frontal collision, this structure enables further effectively applying reaction forces to a collision object.

In more detail, at the time of a small-overlap frontal collision, collision loads toward a rear side of the vehicle are applied to the gusset 30 from the bumper beam 14, the lower beam 16, and the beam coupling member 20. The collision loads that are applied to the gusset 30 are transmitted to the rear end part 30B of the gusset 30 along the gusset 30 and are then applied from the rear end part 30B of the gusset 30 to the side frame 10. Herein, the gusset 30 is tilted outward in the vehicle width direction as it goes forward in a plan view. In this structure, upon receiving the collision loads from the rear end part 30B of the gusset 30, the side frame 10 bends sharply toward inside of the vehicle width direction, starting from the coupled part with the rear end part 30B of the gusset 30. Thus, the sharply bent part of the side frame 10 comes into contact with the power unit "P", and a reaction force from the power unit "P" is applied to a collision object via the gusset 30. In this manner, at the time of a small-overlap frontal collision, reaction forces can be further effectively applied to a collision object from the bumper beam 14, the lower beam 16, and the beam coupling member 20.

Furthermore, as seen from an outer side in the vehicle width direction, the vertical distance H1 between the front end part 30A and the rear end part 30B of the gusset 30 is equal to or less than the vertical distance H2 between the rear end part 30B of the gusset 30 and the upper end part of the power unit "P". This enables the sharply bent part of the side frame 10 to efficiently come into contact with the power unit "P" at the time of a small-overlap frontal collision. The reason of this is as follows. The gusset 30 is tilted upward as it goes rearward as seen from an outer side in the vehicle width direction. In this structure, at the time of a small-overlap frontal collision, the coupled part with the rear end part 30B of the gusset 30 of the side frame 10 (which is a bent part of the side frame 10) is displaced rearward in an oblique direction as seen from an outer side in the vehicle width direction. At this time, since the vertical distance H1 between the front end part 30A and the rear end part 30B of the gusset 30 is equal to or less than the vertical distance H2 between the rear end part 30B of the gusset 30 and the upper end part of the power unit "P", as seen from an outer side in the vehicle width direction, the sharply bent part of the side frame 10 is suppressed from being displaced rearward without coming into contact with the power unit "P". Thus, the sharply bent part of the side frame 10 is efficiently brought into contact with the power unit "P". This enables effectively applying a reaction force from the power unit "P" via the gusset 30, at the time of a small-overlap frontal collision.

From the point of view of effectively applying reaction forces from the vehicle-width-direction outer parts extending outward of the side frame 10 of the bumper beam 14 and the lower beam 16, the vehicle-width-direction outer end parts of the bumper beam 14 and the lower beam 16 are desirably coupled to each other by the beam coupling member 20. However, the part where the bumper beam 14 and the lower beam 16 are coupled by the beam coupling member 20 may be set at any position on an outer side, in the vehicle width direction, of the side frame 10.

The invention claimed is:

1. A vehicle front structure comprising:

side frames in pairs extending in a vehicle front-rear direction of a vehicle respectively on both sides of a front part of the vehicle in a vehicle width direction of the vehicle;

a bumper beam extending in the vehicle width direction, the bumper beam being coupled to respective vehicle-front-side end parts of the side frames, both of longitudinal-direction end parts of the bumper beam being disposed outward in the vehicle width direction, as seen from the side frames;

a lower beam extending in the vehicle width direction on a vehicle lower side of the bumper beam;

coupling members in pairs each extending in a vehicle upward-downward direction of the vehicle on an outer side in the vehicle width direction as seen from a corresponding one of the side frames, the coupling members coupling the bumper beam and the lower beam; and gussets each provided on the outer side in the vehicle width direction, as seen from the corresponding one of the side frames, each of the gussets extending obliquely outward in the vehicle width direction toward a forward of the vehicle as seen from above the vehicle, the each of the gussets extending obliquely downward toward the forward of the vehicle as seen from the vehicle width direction, a vehicle-front-side end part of the each of the gussets being coupled to a middle part of a corresponding one of the coupling members in the vehicle upward-downward direction, a vehicle-rear-side end part of the each of the gussets being coupled to the corresponding one of the side frames.

2. The vehicle front structure according to claim 1, wherein a power unit is disposed between the side frames, and the vehicle-rear-side end part of the each of the gussets is disposed at a position where the vehicle-rear-side end part of the each of the gussets overlaps the power unit as seen from the vehicle width direction.

3. The vehicle front structure according to claim 2, wherein a distance in the vehicle upward-downward direction between the vehicle-front-side end part and the vehicle-rear-side end part of the each of the gussets is equal to or less than a distance in the vehicle upward-downward direction between the vehicle-rear-side end part and a vehicle-upper-side end part of the power unit.

* * * * *